US012775369B2

(12) United States Patent
Ex et al.

(10) Patent No.: US 12,775,369 B2
(45) Date of Patent: *Oct. 27, 2026

(54) CUSTOMIZABLE USER INTERFACE FOR CONTROLLING DIGITAL INTERACTION

(71) Applicant: Truist Bank, Charlotte, NC (US)

(72) Inventors: Elena Ex, Kissimmee, FL (US); Tatiana Zambrano, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 351 days.

This patent is subject to a terminal disclaimer.

(21) Appl. No.: 18/439,882

(22) Filed: Feb. 13, 2024

(65) Prior Publication Data

US 2025/0258585 A1 Aug. 14, 2025

(51) Int. Cl.

| | |
|---|---|
| ***G06F 3/0482*** | (2013.01) |
| ***G06F 3/0484*** | (2022.01) |
| ***G06F 9/451*** | (2018.01) |
| ***G06F 21/31*** | (2013.01) |

(52) U.S. Cl.

CPC .......... *G06F 3/0482* (2013.01); *G06F 3/0484* (2013.01); *G06F 9/451* (2018.02); *G06F 21/31* (2013.01)

(58) Field of Classification Search

CPC ...... G06F 3/0484; G06F 3/0482; G06F 21/31; G06F 9/451

See application file for complete search history.

(56) References Cited

U.S. PATENT DOCUMENTS

| | | | | |
|---|---|---|---|---|
| 8,484,105 | B2 * | 7/2013 | Fox | G06Q 10/087 705/30 |
| 11,328,359 | B1 * | 5/2022 | Dahm | G06F 3/0482 |
| 2013/0024231 | A1 * | 1/2013 | Gordon | G06Q 10/06 705/7.17 |
| 2014/0006972 | A1 * | 1/2014 | Celkonas | G06Q 10/101 715/753 |
| 2014/0324678 | A1 * | 10/2014 | Heine, III | G06Q 10/10 705/316 |
| 2015/0309978 | A1 * | 10/2015 | Howell | G06F 40/169 715/230 |
| 2018/0232742 | A1 * | 8/2018 | Zhao | G06Q 30/016 |
| 2019/0052840 | A1 * | 2/2019 | Taylor | G06Q 20/1085 |
| 2020/0348798 | A1 * | 11/2020 | Shtilkind | G06F 3/04817 |
| 2020/0365264 | A1 * | 11/2020 | Girardeau | G16H 40/20 |
| 2021/0048927 | A1 * | 2/2021 | Bowrin | G06F 3/0482 |
| 2023/0195294 | A1 * | 6/2023 | Li | G06F 3/0481 715/771 |
| 2025/0110599 | A1 * | 4/2025 | Cramer | G06F 3/0481 |

* cited by examiner

*Primary Examiner* — Andrea C Leggett

(74) *Attorney, Agent, or Firm* — Kilpatrick Townsend & Stockton LLP; Michael A. Springs, Esq.

(57) ABSTRACT

A system can be used to provide a customizable user interface for controlling a digital interaction. The system can receive authentication data. The system can provide a first user interface page of a customizable user interface. The system can receive first input indicating selection of an interactive element, corresponding to a digital interaction, on the first user interface page. The system can provide a second user interface page based on the digital interaction. The system can receive second input indicating selection of an interactive element on the second user interface page. The system can control the digital interaction based on the second input and a process associated with the digital interaction.

20 Claims, 5 Drawing Sheets

CUSTOMIZABLE USER INTERFACE FOR CONTROLLING DIGITAL INTERACTION

TECHNICAL FIELD

The present disclosure relates to user interfaces and, more particularly (although not necessarily exclusively), to a customizable user interface that can be used to control a digital interaction with respect to an entity.

BACKGROUND

Digital interactions can be facilitated using a computing device. For example, an entity can use a computing device to request goods, services, resources, or the like from a separate entity. Some digital interactions, however, can involve complexities that can render the digital interactions difficult to enable or otherwise control via a computing device. For example, digital interactions involving multiple steps or phases, investigations, input from multiple parties or entities, and the like can be complex and difficult to enable or otherwise control via a computing device.

SUMMARY

In some examples, a system can include a processor and a memory including instructions that can be executed by the processor to cause the processor to perform various operations. The system can receive authentication data from a user computing device. The authentication data can indicate a request by a user entity associated with the user computing device to access data relating to in-progress digital interactions. The system can provide, in response to the system validating the authentication data, a first user interface page of a customizable user interface to the user computing device. The first user interface page can include a first set of interactive elements, and each interactive element of the first set of interactive elements can represent a different in-progress digital interaction of a set of in-progress digital interactions. The first set of interactive elements can be arranged on the first user interface page to provide the set of in-progress digital interactions as an interactive list. The system can receive first input from the user computing device. The first input can indicate a selection of a particular first interactive element of the first set of interactive elements. The system can provide a second user interface page of the customizable user interface to the user computing device. The second user interface page can include a second set of interactive elements and a set of corresponding alerts. The second user interface page can be generated based on the particular first interactive element. Each at least some of the interactive elements of the second set of interactive elements can represent a particular type of data associated with a process for performing a particular digital interaction of the set of in-progress digital interactions that corresponds with the particular first interactive element. The set of corresponding alerts can be arranged on the second user interface page to solicit interaction of the user entity with the at least some of the interactive elements to facilitate the process for performing the particular digital interaction. The system can receive second input from the user computing device. The second input can indicate a selection of a particular second interactive element of the second set of interactive elements, and the second input can include previously missing data provided by the user entity in response to the system providing the set of corresponding alerts. The system can control the particular digital interaction involving the user entity based on the second input and the process for performing the particular digital interaction.

In additional examples, a method can be used to control a digital interaction using a customizable user interface. The method can include receiving, by a computing system, authentication data from a user computing device. The authentication data can indicate a request by a user entity associated with the user computing device to access data relating to in-progress digital interactions. The method can include providing, by the computing system and in response to the computing system validating the authentication data, a first user interface page of a customizable user interface to the user computing device. The first user interface page can include a first set of interactive elements, and each interactive element of the first set of interactive elements can represent a different in-progress digital interaction of a set of in-progress digital interactions. The first set of interactive elements can be arranged on the first user interface page to provide the set of in-progress digital interactions as an interactive list. The method can include receiving, by the computing system, first input from the user computing device. The first input can indicate a selection of a particular first interactive element of the first set of interactive elements. The method can include providing, by the computing system, a second user interface page of the customizable user interface to the user computing device. The second user interface page can include a second set of interactive elements and a set of corresponding alerts, and the second user interface page can be generated based on the particular first interactive element. Each at least some of the interactive elements of the second set of interactive elements can represent a particular type of data associated with a process for performing a particular digital interaction of the set of in-progress digital interactions that corresponds with the particular first interactive element. The set of corresponding alerts can be arranged on the second user interface page to solicit interaction of the user entity with the at least some of the interactive elements to facilitate the process for performing the particular digital interaction. The method can include receiving, by the computing system, second input from the user computing device. The second input can indicate a selection of a particular second interactive element of the second set of interactive elements, and the second input can include previously missing data provided by the user entity in response to the system providing the set of corresponding alerts. The method can include controlling, by the computing system, the particular digital interaction involving the user entity based on the second input and the process for performing the particular digital interaction.

In additional examples, a non-transitory computer-readable medium can include program code that can be executed by a processing device to cause the processing device to perform various operations. The operations can include receiving authentication data from a user computing device. The authentication data can indicate a request by a user entity associated with the user computing device to access data relating to in-progress digital interactions. The operations can include providing, in response to validating the authentication data, a first user interface page of a customizable user interface to the user computing device. The first user interface page can include a first set of interactive elements, and each interactive element of the first set of interactive elements can represent a different in-progress digital interaction of a set of in-progress digital interactions. The first set of interactive elements can be arranged on the first user interface page to provide the set of in-progress digital interactions as an interactive list. The operations can include receiving first input from the user computing device. The first input can indicate a selection of a particular first interactive element of the first set of interactive elements. The operations can include providing a second user interface page of the customizable user interface to the user computing device. The second user interface page can include a second set of interactive elements and a set of corresponding alerts, and the second user interface page can be generated based on the particular first interactive element. Each at least some of the interactive elements of the second set of interactive elements can represent a particular type of data associated with a process for performing a particular digital interaction of the set of in-progress digital interactions that corresponds with the particular first interactive element, and the set of corresponding alerts can be arranged on the second user interface page to solicit interaction of the user entity with the at least some of the interactive elements to facilitate the process for performing the particular digital interaction. The operation can include receiving second input from the user computing device. The second input can indicate a selection of a particular second interactive element of the second set of interactive elements. The second input can include previously missing data provided by the user entity in response to providing the set of corresponding alerts. The operations can include controlling the particular digital interaction involving the user entity based on the second input and the process for performing the particular digital interaction.

DETAILED DESCRIPTION

Figure 1:
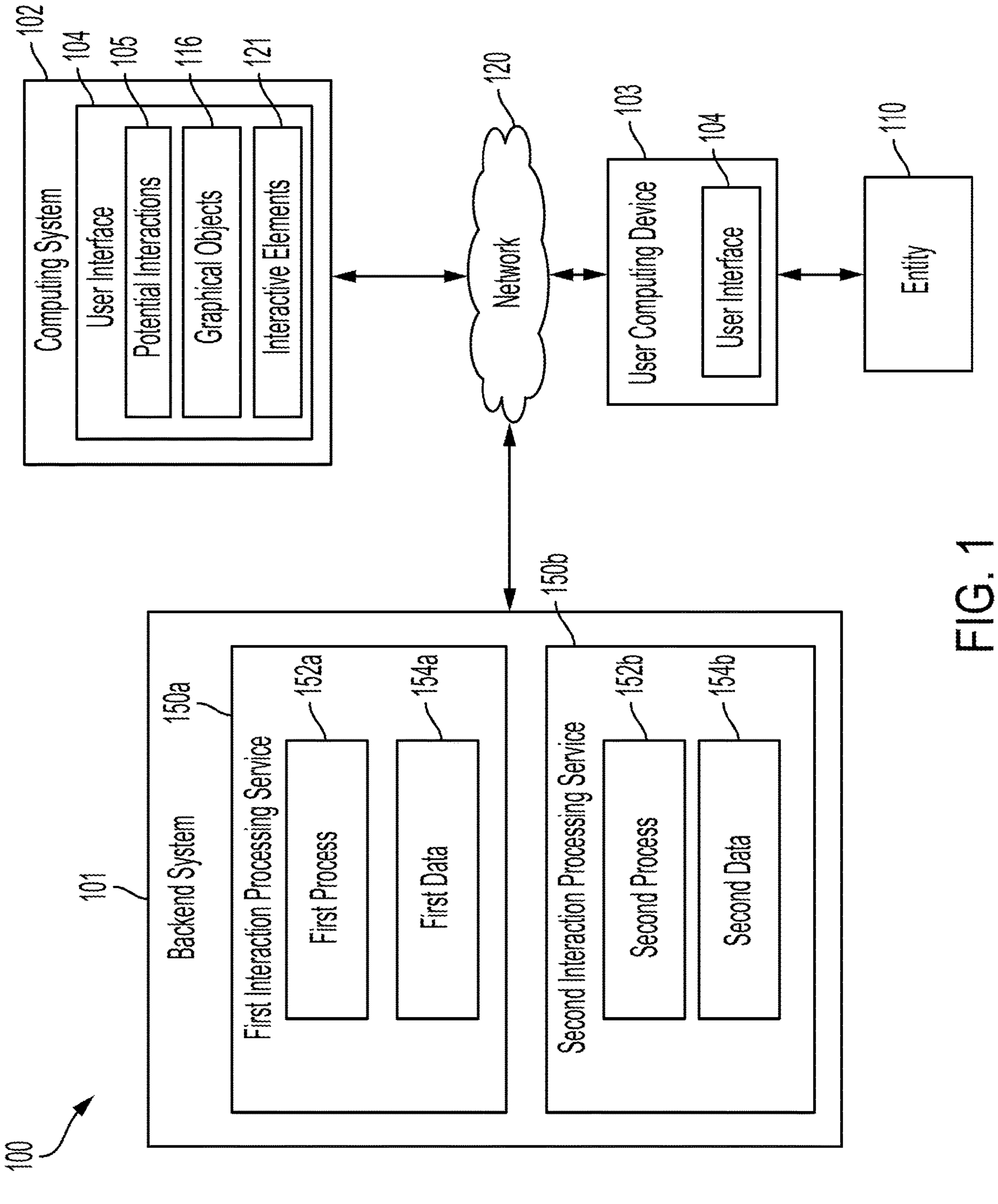
FIG. 1 is a block diagram of an example of a computing environment including a user interface for controlling a digital interaction according to some implementations of the present disclosure.

Certain aspects and features relate to a customizable user interface that can be used to control a digital interaction. The digital interaction can involve an entity, a previously executed interaction, or the like. For example, the digital interaction may be or include a reversal of a previously executed interaction, can include a dispute of a previously executed interaction, or the like. A previously executed interaction may be or include a purchase, such as online or in-person, of a good or a service by the entity, a transfer of resources between the entity and a separate entity, a request to open an account or modify an existing account, or the like. The entity can be or include a user entity such as a user of online computing resources, services, or the like of a providing entity that may be configured to provide, for example via a computing device, the customizable user interface. In some examples, the providing entity may have facilitated the previously executed interaction between the entity and a separate entity with which the previously executed interaction was conducted. The customizable user interface may have multiple pages that can automatically guide the entity with respect to the digital interaction, can automatically keep the entity informed with respect to the digital interaction, and the like. The customizable user interface may include one or more user interface pages that can provide information, that can solicit information, and the like. For example, the customizable user interface can include a first user interface page that can provide the entity with a list or other presentation of potential digital interactions, such as in-progress digital interactions, with which the entity is associated. Additionally or alternatively, the customizable user interface can include one or more second user interface pages that can provide specific details about a selected digital interaction, that can guide the entity to take action for completing the digital interaction, that can solicit specific information or data from the entity for proceeding with the digital interaction, and the like.

An entity can initiate or otherwise engage in an interaction. The interaction may be or include a real-world interaction, a digital interaction, or a combination thereof. For example, the entity may use an account to transfer resources to a separate entity to request or receive goods, services, content, or the like from the separate entity. The interaction may be successful such as if the goods, services, content, or the like are successfully received by the entity. In other examples, the interaction may be unsuccessful. The entity may not successfully receive the goods, services, content, or the like, may be unsatisfied with the goods, services, content, or the like, etc. Additionally or alternatively, the interaction may not be legitimate. For example, a malicious entity may gain access to the account and may use the account to provide resources to the separate entity for the goods, services, content, or the like without authorization from the entity.

Reversing previously executed interactions due to malicious intent, due to a lack of satisfaction of the entity, or due to a failure of the previously executed interactions to be completed successfully can be difficult. For example, conventional techniques for reversing previously executed interactions may not be allowed or enabled to be conducted as a digital interaction, so the conventional techniques may be slow, may be inaccurate due to human error and lack of oversight, and may not be resolved due to an inefficiency of communication with the entity requesting reversal. Thus, conventional techniques may inhibit or otherwise hinder interactions from proceeding.

In some implementations of the present disclosure a customizable user interface can be used to address the above-described technical problems and additional technical problems. For example, the customizable user interface can allow the digital interaction, which may include or involve reversing a particular previously executed interaction, to be executed or otherwise controlled digitally. For example, the customizable user interface may include one or more user interface pages that can provide information about the digital interaction, that can guide the entity regarding how to proceed with the digital interaction, that can solicit information or data from the entity to facilitate the digital interaction, and the like. By using the customizable user interface, the digital interaction can be controlled or otherwise facilitated by providing sufficient information and guidance to the entity and by receiving sufficient information and data from the entity. In some examples, controlling the digital interaction can involve determining information needed to proceed with the digital interaction, receiving information for initiating the digital interaction, communicating with backend servers to initiate the digital interaction, causing the digital interaction to execute, and the like.

In some examples, an entity can use a user computing device to access the customizable user interface. A computing system can receive an authentication request from the user computing device. The authentication request can include a request to access an account associated with the entity and may include authentication data such as a username/password combination, biometric data, and the like. In response to verifying that the authentication request is legitimate and accurate, the computing system can provide access to the account to the user computing device such as via a user interface. Additionally or alternatively, the user computing device can be used to navigate to the customizable user interface of the account. For example, the entity can interact with the user computing device to select the customizable user interface, which may be presented as an option on the user interface of the account.

In response to receiving an indication to provide the customizable user interface, the computing system may provide at least a first user interface page of the customizable user interface. For example, the computing system may generate the first user interface page to include a list or other suitable presentation of data for potential digital interactions, such as in-progress digital interactions, associated with the account that the entity accessed. The in-progress digital interactions may include one or more disputed previously executed interactions, one or more reversals of previously executed interactions, and the like that are associated with the account. In some examples, the in-progress digital interactions may be digital interactions that the entity requested to be initiated but that have yet to be initiated or that have yet to be completed. The first user interface page may provide details about the in-progress digital interactions. For example, the first user interface page may provide dates of initiation of the digital interactions, may provide names of the digital interactions, may provide status indicators for the digital interactions, and the like. Additionally or alternatively, the first user interface page may allow interaction with the in-progress digital interactions to request additional information about a selected digital interaction. For example, the first user interface page may include a set of interactive features that correspond to the in-progress digital interactions, and selecting a particular digital interaction may involve clicking a particular interactive feature corresponding to the particular digital interaction.

The computing system can receive input from the entity indicating selection of the particular interactive feature corresponding to the particular digital interaction. The computing system can subsequently receive additional details specific to the particular digital interaction based on the selection. For example, the computing system can use the selection to access a data repository to retrieve data relating to the particular digital interaction. The computing system can generate a second user interface page based on data received about the particular digital interaction, and the computing system can provide the second user interface page to the user computing device.

The second user interface page can include specific details about the particular digital interaction. For example, the specific details can include information required to proceed with the particular digital interaction, information not yet received from the entity for the particular digital interaction, information already provided by the entity with respect to the particular digital interaction, a date of, or other information associated with, the previously executed interaction associated with the particular digital interaction, and the like. In some examples, the second user interface page can guide the entity for facilitating the particular digital interaction. Guiding the entity can include providing fields or other interactive features on the second user interface page with which the entity can interact to provide missing information for proceeding with the particular digital interaction. Additionally or alternatively, guiding the entity can include providing alerts or other information along with the fields or other interactive features to instruct the entity specifically which information is missing, where to find the missing information, how to provide the missing information via the second user interface page, and the like.

The computing system can receive input from the entity via the second user interface page. For example, the computing system can receive an uploaded document, natural language text from a keyboard as input, a link to requested information or documentation, or the like. The computing system can determine whether the received input from the entity satisfies the remaining requirements for initiating the particular digital interaction. In examples in which the received input does satisfy the remaining requirements, the computing system may transmit the received information, along with any additional and relevant information, to a particular backend processing system that can initiate the digital interaction. In other examples, the computing system may use the received information, along with any additional and relevant information, to directly initiate the digital interaction, which may include providing resources to the account, reversing the previously executed interaction, or the like. In examples in which the received input does not satisfy the remaining requirements, the computing system may provide a notification to the entity stating such. The notification may indicate that the received information is accepted, or is not accepted due to data corruption, incorrect information, or the like, and may include an indication of additional information requested from the entity to be able to initiate the digital interaction.

In some examples, the second user interface can be generated based on a process associated with the particular digital interaction or any data associated therewith. For example, if the data associated with the particular digital interaction indicates that the account is a credit card account, then the second user interface can be generated based on a process for initiating the particular digital interaction for the credit card account. In another example, if the data associated with the particular digital interaction indicates that the account is an online security account, then the second user interface can be generated based on a process for initiating the particular digital interaction for the online security account. Additionally or alternatively, initiating the digital interaction may involve communicating with a particular backend processing system of a set of backend processing systems. The computing system can identify a particular backend processing system with which to interact to initiate the digital interaction based at least in part on the process. For example, if the process is associated with a credit card account or an online digital account, then the computing system can determine to interact with a credit-card-type backend processing system or an online-account-type backend processing system, respectively, to initiate the digital interaction.

These illustrative examples are given to introduce the reader to examples of the general subject matter discussed here and are not intended to limit the scope of the disclosed concepts. In the following description, for the purposes of explanation, specific details are set forth in order to provide a thorough understanding of various implementations and examples. Various implementations may be practiced without these specific details. The figures and description are not intended to be restrictive.

FIG. 1 is a block diagram of an example of a computing environment 100 including a user interface for controlling a digital interaction according to one aspect of the present disclosure. Examples of the digital interaction, which may be included in potential interactions 105, can include retrieving requested resources, such as data from a database, or performing a requested function such as reversing a previously executed interaction on behalf of an entity. The computing environment 100 can be used, for example, to facilitate processing interaction requests and can improve (i) data security by monitoring digital interaction requests and progress for unauthorized or unsuccessful previously executed interactions and (ii) interaction initiation accuracy by providing customizable user interface 104. The digital interactions controlled or otherwise facilitated by the computing system 102 can be associated with one or more entities, such as users, organizations, devices, and the like.

In some examples, the computing environment 100 can include a backend system 101, the computing system 102, a user computing device 103, an entity 110, a network 120, though the computing environment 100 may include any suitable additional or alternative components. The backend system 101, the computing system 102, the user computing device 103, and any other component or computing device of the computing environment 100 may be communicatively coupled with one another, or with a subset of one another, via the network 120. Additionally or alternatively, the entity 110 may communicate with the user computing device 103 via one or more input or output devices such as a microphone, a keyboard, a computer mouse, a touchscreen display, and the like.

The entity 110 can use the user computing device 103 to access the network 120 to request resources, information, and the like from the computing system 102. For example, the user computing device 103 can receive natural language input, indications of selections, and the like from the entity 110, and the user computing device 103 can convert the received input into a call, such as an API call, that can be made via the network 120. In some examples, the network 120 can include any type of network that can support data communications using any of a variety of commercially available protocols. Examples of the network 120 can include TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. In some examples, the network 120 may be or include a local area network (LAN) such as one based on Ethernet, Token-Ring or the like. The network 120 also may be or include a wide-area network, such as the Internet, or may include financial networks or banking networks, telecommunication networks such as a public switched telephone networks (PSTNs), cellular or other wireless networks, satellite networks, television/cable networks, or virtual networks such as an intranet or an extranet, etc. Infrared and wireless networks, such as those using the Institute of Electrical and Electronics (IEEE) 802.11 protocol suite or other wireless protocols, may also be included in the communication networks.

The computing system 102 can receive the call from the user computing device 103 and can provide the customizable user interface 104, and any user interface pages included therein, to the user computing device 103. The customizable user interface 104 can indicate the potential interactions 105, can include graphical objects 116, can include interactive elements 121, and the like. The potential interactions 105 may be or include potential digital interactions, which may be or include disputed previously executed interactions, requests for reversal of previously executed interactions, and the like. In some examples, the potential digital interactions may be or include in-progress digital interactions. The graphical objects 116 may be or include features that can be displayed on the customizable user interface 104 and that may or may not be interactive. For example, the graphical objects 116 may include design features of the customizable user interface 104, may include logos, emblems, trademarks, etc., and the like. The interactive elements 121 may be or include features that can be displayed on the customizable user interface 104 and with which can be interacted. For example, the entity 110 may use the user computing device 103 to interact, for example by clicking or otherwise suitably indicating selection, with one or more of the interactive elements 121. In some examples, the interactive elements 121 may include one or more subsets of possible interactive elements that can be provided via the customizable user interface 104. The one or more subsets of possible interactive elements can include a set of first interactive elements and a set of second interactive elements. The set of first interactive elements can be or include interactive elements that correspond to or otherwise represent a particular potential interaction of the potential interactions 105. Additionally or alternatively, the set of second interactive elements can be or include interactive elements that correspond to or otherwise represent particular data or types of data associated with a selected potential interaction of the potential interactions 105.

In response to receiving a request from the user computing device 103 to access an account associated with the entity 110, the computing system 102 can verify an authenticity of the request. For example, the request may be or include an authentication request with authentication data, and the computing system 102 can request an authentication, such as an enhanced or more scrutinized authentication, from the entity 110, for example to verify an identity of the entity 110 or a validity of the received request. For example, the computing system 102 may request that the entity 110 provide multifactor authentication (MFA) as the authentication to verify the identity of the entity 110. Providing the MFA can involve inputting one or more additional or alternative authentication factors than those included in the received request. Examples of the authentication factors can include a username, password, biometric marker, personal identification number (PIN), authentication code, one-time password authentication, or any combination thereof. In some examples, the user computing device 103 may include an authenticator application installed on the user computing device 103 to provide the MFA as the authentication to the computing system 102.

In response to authenticating the request or otherwise determining that the request is legitimate, the computing system 102 can provide the customizable user interface 104 to the user computing device 103. In some examples, the computing system 102 can access information relating to the account of the entity 110 to populate a first user interface page of the customizable user interface 104. The accessed information may be or include digital interactions that the entity 110 has previously, or is presently, requesting to initiate. The digital interactions may be or include disputed previously executed interactions, reversals of previously executed interactions, and the like. The computing system 102 can generate a list of interactive elements, such as a first subset of the interactive elements 121, to be provided to the entity 110 via the first user interface page. Additionally or alternatively, the computing system 102 can populate the first user interface page with the list and can transmit the first user interface page to the user computing device 103.

Via the user computing device 103, the entity 110 can provide input for selecting a particular interactive element presented on the first user interface page. Selecting the particular interactive element can cause a drop-down menu to appear with specific details about an in-progress digital interaction corresponding to the particular interactive element. In some examples, selecting the particular interactive element can cause the computing system 102 to generate and transmit a second user interface page to the user computing device 103. The second user interface page may be displayed in front of, alongside, or instead of (e.g., replacing) the first user interface page. For example, the second user interface page may be a modified version of the first user interface page. In a particular example, the second user interface page may be or include a drop down (e.g., a menu, status notification, etc.) that can display additional elements, such as a second set of interactive elements, graphical objects, or the like, in response to receiving input indicating selection of a particular digital interaction.

The computing system 102 can receive selection of the particular interactive element from the user computing device 103 and can determine to which in-progress digital interaction the particular interactive element corresponds. In other examples, the computing system 102 can receive additional or alternative input that can indicate a selection of a particular digital interaction, for example without a direct selection of a particular interactive element. For example, the computing system 102 can receive, such as via the user computing device 103, a voice command from the entity 110, and the voice command may indicate that the entity 110 has selected the particular digital interaction even if the entity 110 did not provide input selecting the particular interactive element. In such examples, the list of digital interactions may not be interactive, but the list of digital interactions may enable a selection of the particular digital interaction via input provided by the entity 110.

The computing system 102 can determine a particular process for initiating the digital interaction, for completing the digital interaction, and the like. Additionally or alternatively, the computing system 102 can determine a set of data, documents, information, and the like that can be used to initiate or complete the digital interaction. In some examples, to determine the process or the set of data, etc., the computing system 102 can analyze the digital interaction to identify a type of account associated with the digital interaction, to identify a progress of the digital interaction, to identify a type or other classification associated with a previously executed interaction of the digital interaction, and the like. The computing system 102 can use a result of the analysis to determine the process, to determine the set of data, etc., and the like. Additionally or alternatively, the computing system 102 can use the result of the analysis to control communication between the computing system 102 and the backend system 101, for example to initiate or facilitate a digital interaction.

The computing system 102 can populate the second user interface page based on the analysis. For example, the computing system 102 can embed a second subset of interactive elements from the interactive elements 121 in the second user interface page. The computing system 102 can identify or generate the second subset of interactive elements based on the selected interactive element from the first user interface page. For example, the selected interactive element may indicate the particular digital interaction selected by the entity 110, and the computing system 102 can access or otherwise receive data relating to the particular digital interaction to identify or generate the second subset of interactive elements. The second subset of interactive elements can represent data for initiating the digital interaction, for facilitating the digital interaction, for completing the digital interaction, or the like.

In a particular example, the particular digital interaction may be a dispute against a previously executed interaction as allegedly being fraudulent. The computing system 102 can identify a particular process for initiating or resolving the dispute or otherwise reversing the previously executed interaction. Additionally or alternatively, the computing system 102 can identify a set of data, etc., that can be used to initiate the dispute, that can be used to support the dispute, that can be used to resolve the dispute, and the like. For example, the set of data, etc., can include documentation showing that the previously executed interaction is fraudulent, a natural language statement produced by the entity 110, historical financial records showing a pattern not supportive of the previously executed interaction, and the like. The computing system 102 can identify or generate the second subset of interactive elements based on the set of data, etc., and can populate the second user interface page with the identified or generated second subset of interactive elements.

In another example, the particular digital interaction may be a dispute against a previously executed interaction as allegedly being incomplete or unsatisfactory. The computing system 102 can identify a particular process for initiating or resolving the dispute or otherwise reversing the previously executed interaction. Additionally or alternatively, the computing system 102 can identify a set of data, etc., that can be used to initiate the dispute, that can be used to support the dispute, that can be used to resolve the dispute, and the like. For example, the set of data, etc., can include documentation showing that the previously executed interaction was not completed, a natural language statement produced by the entity 110 indicating dissatisfaction with the previously executed interaction, and the like. The computing system 102 can identify or generate the second subset of interactive elements based on the set of data, etc., and can populate the second user interface page with the identified or generated second subset of interactive elements.

The user computing device 103 can receive the second user interface page and can provide the second user interface page to the entity 110. The user computing device 103 can receive input from the entity 110 indicating selection of, or providing additional information relating to, a particular interactive element of the second subset of interactive elements, and the user computing device 103 can transmit the input to the computing system 102. In some examples, the input may include a selection of a particular interactive element that may be configured to solicit information from the entity 110 to support or facilitate the in-progress digital interaction. In a particular example, the particular interactive element may be a field to allow the entity 110 to provide a natural language statement, and the field may be positioned proximate to a notification informing the entity 110 that the natural language statement is required prior to initiating the in-progress digital interaction. The computing system 102 can receive the input and determine if any other information or data is needed prior to initiating or otherwise controlling the digital interaction. For example, the input may satisfy a portion of the information or data, but not all of the information or data, and the computing system 102 can transmit a notification requesting remaining portions of the information or data. Additionally or alternatively, the input may satisfy the remaining portions of the information or data, and the computing system 102 may proceed with initiating, facilitating, or otherwise controlling the digital interaction.

The computing system 102 may be communicatively coupled with the backend system 101 such as via the network 120. In other examples, the backend system 101 may be integrated with the computing system 102 such as included in software or hardware of the computing system 102, or vice versa. The computing system 102 can generate a call, such as an API call, a query, or the like, and can transmit the call to the backend system 101. The call may include the data or information required to initiate or complete the digital interaction. Additionally or alternatively, the call may include an indication of a particular backend processing service to use for initiating or completing the digital interaction. The computing system 102 may determine which backend processing service to use based on the type of digital interaction, the type of previously executed interaction associated with the digital interaction, the available data for initiating the digital interaction, or the like.

The backend system 101 may include various backend processing systems, or may be one of multiple backend systems having one or more backend processing systems each. As illustrated in FIG. 1, the backend system 101 can include a first interaction processing system **150*a* and a second interaction processing system 150*b*, though other suitable numbers (e.g., one or more than two) of interaction processing systems are possible for the backend system 101. The first interaction processing system 150*a* may be configured to perform a first process 152*a* using first data 154*a*, and the second interaction processing system 150*b* may be configured to perform a second process 152*b* using second data 154*b***.

The backend system 101 may receive the call from the computing system 102 and may divert the data included in the call to the first interaction processing system **150*a* or the second interaction processing system 150*b*. For example, the call may indicate a particular process to perform to initiate the digital interaction. Additionally or alternatively, the call may include types of data that at least approximately match the respective data that the first interaction processing system 150*a* or the second interaction processing system 150*b* is configured to use. In a particular example, the first data 154*a* may include interaction details, pdf statements, and a natural language oath, and the call may include data that includes interaction details, pdf statements, and a natural language oath, etc. The backend system 101 can cause the respective process to be executed, or, in other examples, the computing system 102** may cause the respective process to be executed or otherwise controlled based on the call.

Although FIG. 1 illustrates a particular number and arrangement of components, FIG. 1 is intended to be illustrative and non-limiting. Other examples may include more components, fewer components, different components, or a different arrangement of the components shown in FIG. 1. Any suitable arrangement of the depicted components is contemplated herein.

Figure 2:
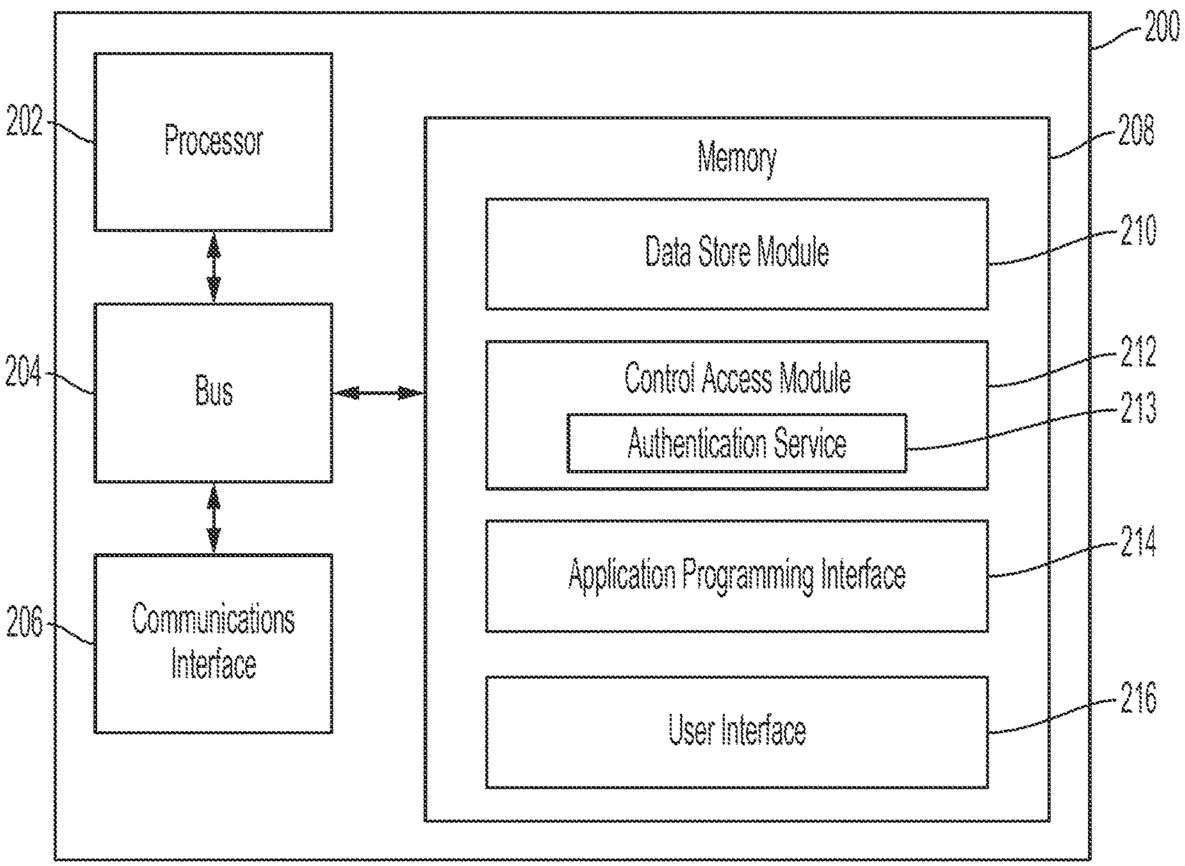
FIG. 2 is a block diagram of an example of a computing device that can be used to provide a user interface for controlling a digital interaction according to some implementations of the present disclosure.

FIG. 2 is a block diagram of an example of a computing system 200, such as the computing system 102, that can be used to provide a user interface 216, such as the customizable user interface 104, for controlling a digital interaction according to one example of the present disclosure. The computing system 200 may be a network device and may include a processor 202, a bus 204, a communications interface 206, and a memory 208. In some examples, the components illustrated in FIG. 2 may be integrated into a single structure. For example, the components can be within a single housing. In other examples, the components illustrated in FIG. 2 can be distributed, such as in separate housings, and in electrical communication with each other.

The processor 202 may execute one or more operations for implementing various examples and embodiments described herein. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled to the memory 208 via the bus 204. The memory 208, such as non-volatile memory, may include any type of memory device that retains stored information when powered off. Examples of the memory 208 can include electrically erasable and programmable read-only memory ("EEPROM"), flash memory, or any other type of non-volatile memory. In some examples, at least some of the memory 208 may include a medium from which the processor 202 can read instructions. A computer-readable medium may include electronic, optical, magnetic, or other storage devices capable of providing the processor 202 with computer-readable instructions or other program code. Examples of a computer-readable medium can include magnetic disk(s), memory chip(s), ROM, random-access memory ("RAM"), an ASIC, a configured processor, optical storage, or any other medium from which a computer processor may read instructions. The instructions may include processor-specific instructions generated by a compiler or an interpreter from code written in any suitable computer-programming language, including, for example, C, C++, C#, Java, Python, Perl, R, etc.

The communications interface 206 may interface other network devices or network-capable devices to analyze and receive information related to accessing functions of an application. Information received from the communications interface 206 may be sent to the memory 208 via the bus 204. The memory 208 can store any information received from the communications interface 206.

The memory 208 may include program code for determining user interface pages, and data to embed therein, to provide for the user interface 216. The program code may cause the computing system 200, or any component within the computing system 200, to make calls, such as API calls, to separate computing devices or backend systems to provide the user interface 216, to initiate or control the digital interaction, etc. The memory 208 may additionally include program code for a data store module 210, a control access module 212, an API 214, and the user interface 216. In some examples, the API 214 can perform functions including making API calls for causing the digital interaction to be executed or otherwise controlled, for providing the user interface 216 to the user computing device 103, etc. In some examples, the user interface 216 may be the customizable user interface, such as the customizable user interface 104 of FIG. 1, to allow the computing system 200 to receive user input that can be used to perform functions. Examples of functions can include determining the data to request from the entity 110, retrieving information regarding previously executed interactions, data to display to the entity 110, etc.

The data store module 210 may store information, such as username and password, security information, transactional data, etc., relating to a user account for a number of users and client devices, such as the user computing device 103, including originating IP addresses of login attempts, browser settings of login attempts, etc. The control access module 212 may include or be communicatively coupled to an authentication service 213 and may validate whether a user access attempt has been successfully authenticated after a user has entered correct account login information. In some cases, the control access module 212 may additionally or alternatively determine the process and data to use to initiate or control the digital interaction. The results from the control access module 212 may be used by the API 214 to request access to the user account, to determine an authentication process to perform with respect to the requested function, to authenticate the requested function (e.g., via the determined authentication process), and to cause the requested function to be executed. Additionally or alternatively, the results from the control access module 212 may be used by the user interface 216 or the computing system 200 to send a request for data or to send a request to execute a function to an API such as the API 214.

In some examples, the API 214 and the user interface 216 may be unintegrated or otherwise distributed among more than one server. For example, instead of the API 214 and the user interface 216 being included in the computing system 200, the API 214 can be included in a first server and the user interface 216 can be included in a second server. In this example, the first server and the second server may include separate housings, separate processors, separate memory, etc. The first server may be configured to perform the functions associated with the API 214, and the second server may be configured to perform the functions associated with the user interface 216. In combination, the first server and the second server may be configured to perform the functions of the computing system 200.

Figure 3:
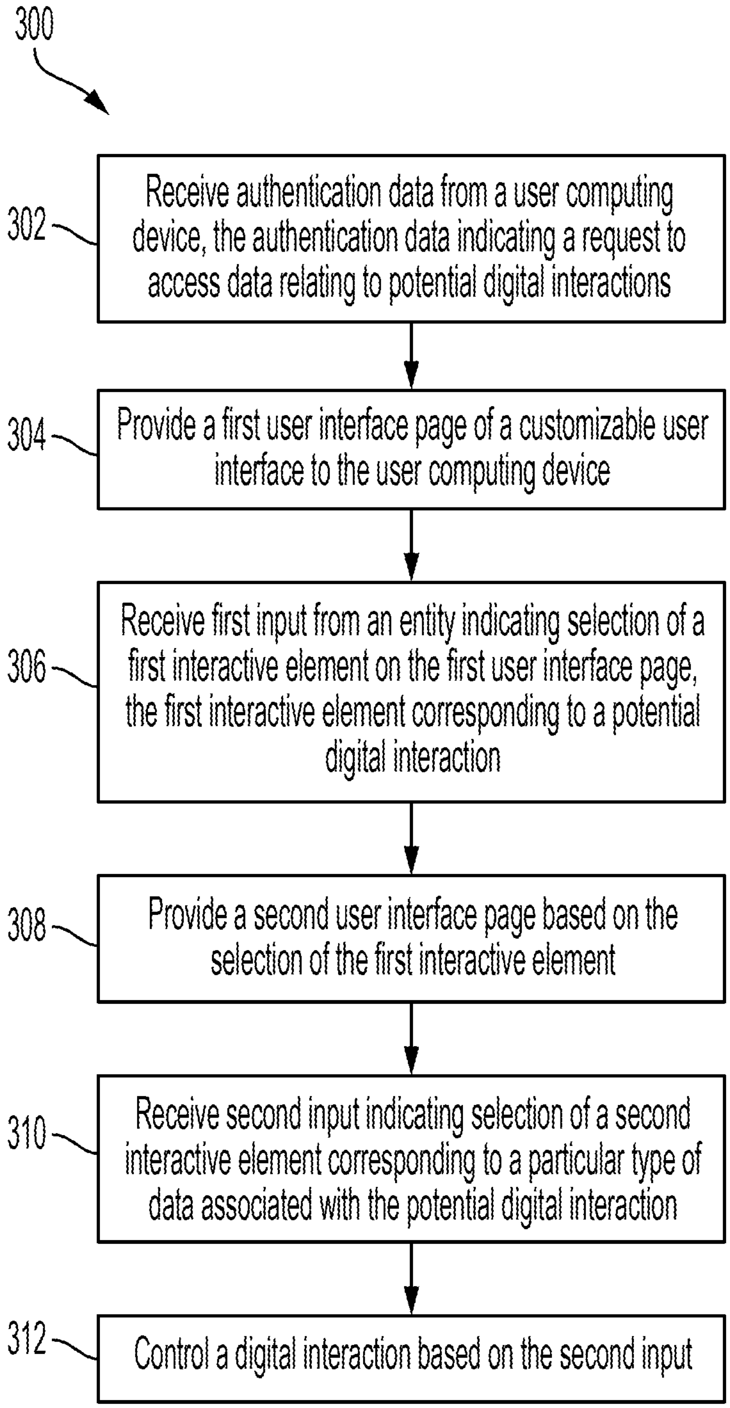
FIG. 3 is a flowchart of a process for controlling a digital interaction using a user interface according to some implementations of the present disclosure.

FIG. 3 is a flowchart of a process 300 for controlling a digital interaction using a user interface according to one example of the present disclosure. In some examples, the computing system 102, or components such as processor 202, or other components of the computing system 200, can perform one or more of the steps illustrated in FIG. 3. In other examples, the processor 202 can implement more steps, fewer steps, different steps, or a different order of the steps illustrated in FIG. 3. The steps of FIG. 3 are described below with reference to components discussed above in FIGS. 1-2.

At block 302, authentication data is received by the computing system 102 from a user computing device 103. The authentication data may be included in an authentication request that may be transmitted to the computing system 102 to request access to an account associated with an entity 110. The account may be or include a financial services account, an online security account, or the like, and the account may be provided by a providing entity associated with the computing system 102. Additionally or alternatively, the authentication data may indicate a request by the entity 110 to view or otherwise gain access to a customizable user interface 104 that can be used to control a digital interaction such as a dispute of a previously executed interaction, a reversal of a previously executed interaction, or the like. The customizable user interface 104 may be configured to provide access to data relating to a set of in-progress digital interactions, which may have been requested to be initiated but may not yet have been initiated.

At block 304, the computing system 102 provides a first user interface page to the user computing device 103. The computing system 102 can authenticate the authentication request or otherwise determine that the authentication request is legitimate. In response to authenticating the authentication request, the computing system 102 can provide the first user interface page to the user computing device 103. In some examples, the computing system 102 can access a data repository to identify data to embed or otherwise include in the first user interface page. For example, the computing system 102 may access the account of the entity 110 to identify pending requests for initiating digital interactions and may populate the first user interface page based on the identified pending requests. The computing system 102 may otherwise suitably identify or generate data to embed or otherwise include in the first user interface page. In some examples, the data embedded or otherwise included in the first user interface page may include a first set of interactive elements. Each interactive element of the first set of interactive elements may correspond to a different digital interaction of the set of digital interactions.

At block 306, the computing system 102 receives first input from the user computing device 103. The first input may indicate selection of a particular interactive element of the first set of interactive elements. For example, the entity 110 may interact with the user computing device 103 to select, such as via a keyboard, a computer mouse, etc., the particular interactive element. The particular interactive element may correspond to a particular digital interaction that the entity 110 wants to view or alter. In other examples, the computing system 102 can receive additional or alternative input that can indicate a selection of a particular digital interaction, for example without a direct selection of a particular interactive element. For example, the computing system 102 can receive, such as via the user computing device 103, a voice command from the entity 110, and the voice command may indicate that the entity 110 has selected the particular digital interaction even if the entity 110 did not provide input selecting the particular interactive element. In such examples, the list of digital interactions may not be interactive, but the list of digital interactions may enable a selection of the particular digital interaction via input provided by the entity 110.

At block 308, the computing system 102 provides a second user interface page of the customizable user interface 104 to the user computing device 103. The computing system 102 can receive the first input and can determine how to generate the second user interface page. For example, the first input may indicate the particular digital interaction, and the computing system 102 may use information about the particular digital interaction to generate the second user interface page or to otherwise determine data and other features to embed in the second user interface page. The particular digital interaction may require or otherwise involve a set of types of data prior to being initiated. For example, the particular digital interaction may involve particular documents, particular input from the entity 110, and the like, and sometimes in a particular order, prior to being initiated. The computing system 102 can identify the set of types of data and whether each type of data has been satisfied or otherwise received. Based on this, the computing system 102 can generate the second user interface page to have a second set of interactive elements corresponding to the set of types of data. Additionally or alternatively, the computing system 102 can generate the second user interface page to include a set of alerts corresponding to the second set of interactive elements. Each alert of the set of alerts may indicate whether action or input is being solicited from the entity 110.

At block 310, the computing system 102 receives second input from the user computing device 103. The second input may indicate selection of a particular interactive element of the second set of interactive elements by the entity 110. The selection may involve natural language input, clicking a link to provide, such as upload, a requested document, or the like. In some examples, the second input may involve the entity 110 providing remaining data for initiating the particular digital interaction. The computing system 102 can analyze the second input to determine whether additional information or input from the entity 110 may be requested prior to initiating the digital interaction. In some examples, the computing system 102 can receive the second input and update a presentation of the second user interface page such as by adjusting the set of corresponding alerts, by adjusting or removing a subset of the second set of interactive elements, and the like.

At block 312, the computing system 102 controls the particular digital interaction based on the second input. The computing system 102 can, for example based on the particular digital interaction, the set of types of data about the particular digital interaction, etc., determine a process for executing, initiating, or otherwise controlling the particular digital interaction. The computing system 102 can determine that sufficient amounts and types of data have been received for controlling the particular digital interaction. For example, the computing system 102 can use data received via the second input to cause the particular digital interaction to be initiated by, for example, transmitting the sufficient amounts and types of data to a backend processing system to cause the in-progress digital interaction to be executed. In other examples, the computing system 102 may include the backend system and may directly initiate and execute the particular digital interaction.

Figure 4:
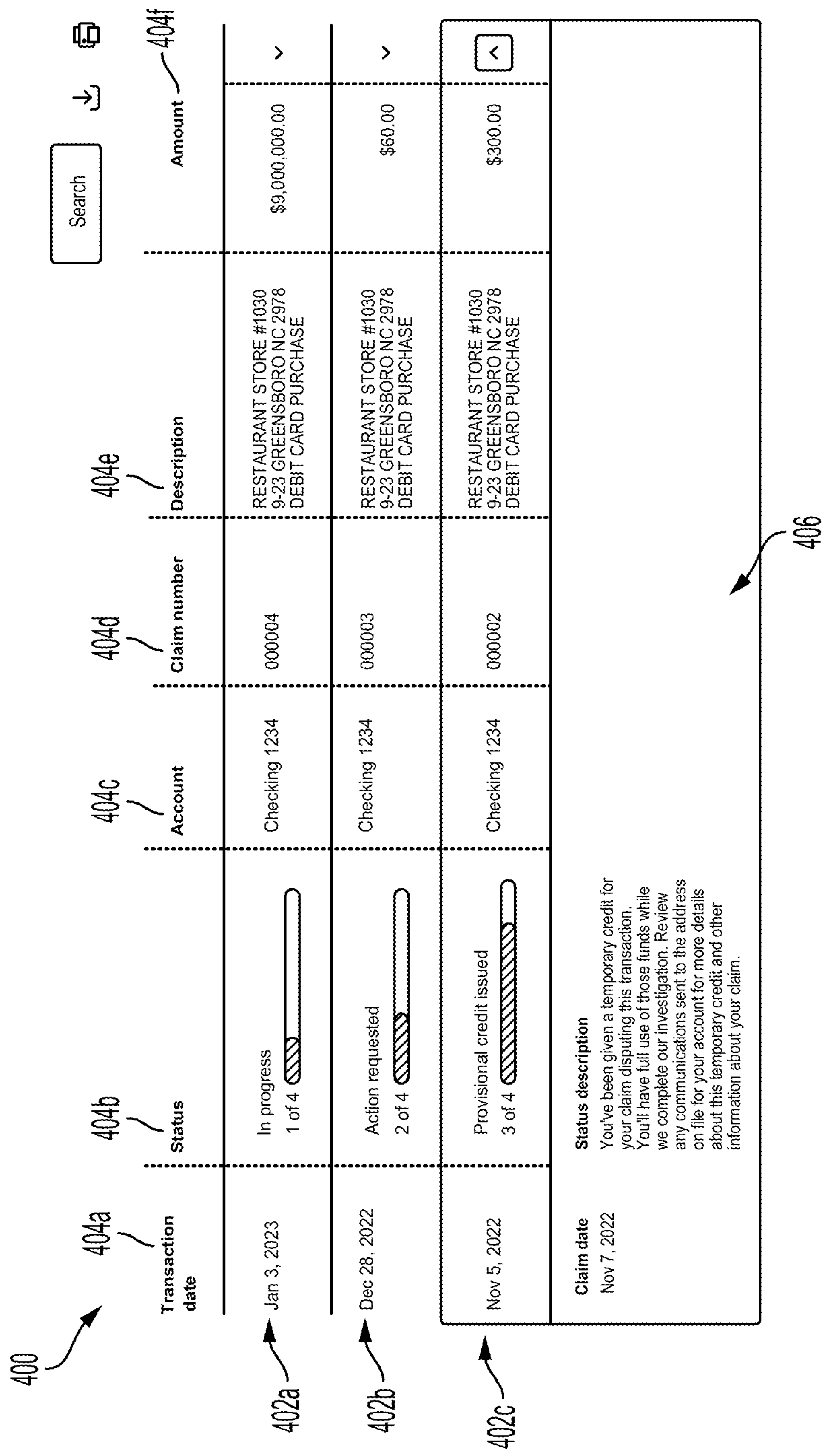
FIG. 4 is an example of a first page of a customizable user interface that can be used to control a digital interaction according to some implementations of the present disclosure.

FIG. 4 is an example of a first page 400 of a customizable user interface 104 that can be used to control a digital interaction according to one example of the present disclosure. As illustrated in FIG. 4, the first page 400 can include rows 402*a-c* and columns 404*a-f*, though any other suitable numbers of rows and columns are possible for the first page 400. The rows 402*a-c* may be arranged vertically offset from one another to form a list and may be or include interactive elements. Each row of the rows 402*a-c* may represent a different digital interaction of a set of digital interactions associated with a particular entity or account thereof. The columns 404*a-f* may be or include graphical features that may be configured to provide particular types of data relating to the set of digital interactions.

In some examples, selecting a particular row of the rows 402*a-c* may cause a drop-down menu to appear, may cause a different user interface page to be generated and displayed, may cause different data to be displayed via the first page 400, and the like. For example, row 402*c* is illustrated as including a drop-down description 406, which may have been generated in response to selecting the row 402*c*. Alternative examples of selection can include generating a separate user interface page to display the data included in the drop-down description 406, generating an additional user interface to display the data included in the drop-down description 406, and the like. For example, selecting a particular row of the rows 402*a-c* may cause a second user interface page of the customizable user interface 104 to be generated and provided.

Figure 5:
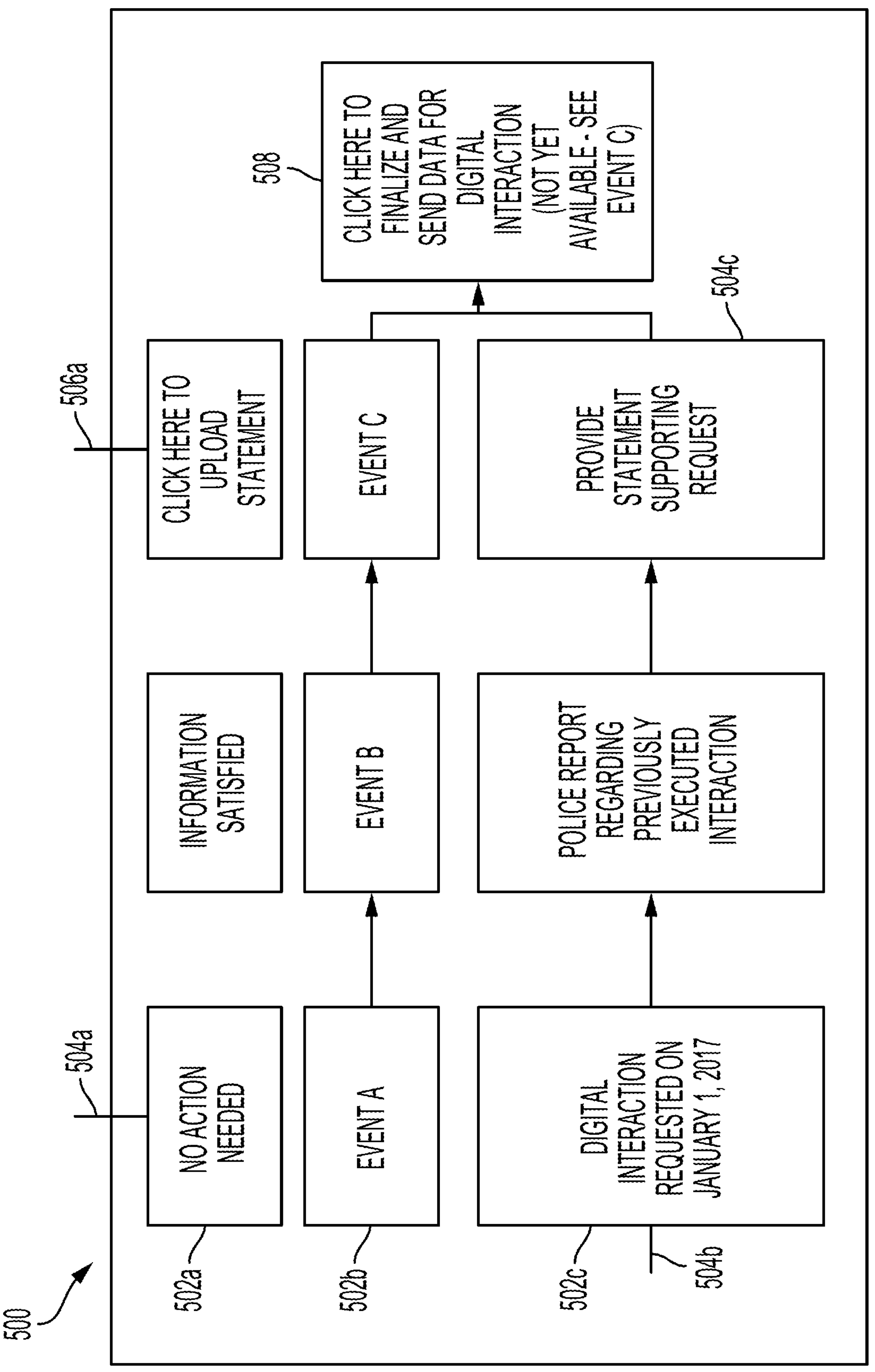
FIG. 5 is an example of a second page of a customizable user interface that can be used to control a digital interaction according to some implementations of the present disclosure.

FIG. 5 is an example of a second page 500 of a customizable user interface 104 that can be used to control a digital interaction according to one example of the present disclosure. The second page 500 may be a separate user interface page compared to the first page 400, may be a drop-down menu of an interactive element included on the first page 400, may be a sub-page of the first page 400, or the like. As illustrated in FIG. 5, the second page 500 is a separate user interface page generated based on input received via a selection on a first user interface page, such as the first page 400, though the second page 500 can be or include other examples of second user interface pages such as the drop-down menu of the first user interface page, a sub-page of the first user interface page, etc.

As illustrated in FIG. 5, the second page 500 can include a first row 502*a*, a second row 502*b*, and a third row 502*c*, though other suitable numbers (e.g., less than three or more than three) are possible for the second page 500. Each row of the rows included in the second page 500 may provide the same or similar type of information as other rows included in the second page 500. For example, the first row 502*a* may provide information relating to whether a type of data has been sufficiently satisfied, the second row 502*b* may provide information indicating which step the in-progress digital interaction is presently at, and the third row 502*c* may provide information about a description of the event or associated type of data. Other types of information are possible within the scope of the present disclosure.

In some examples, the first row 502*a*, the second row 502*b*, and the third row 502*c* may include one or more interactive elements, graphical objects, or a combination thereof. As illustrated in FIG. 5, the first row 502*a* may include graphical object 504*a* and interactive element 506*a*, the third row 502*c* may include graphical object 504*b* and graphical object 504*c*, and so on. In other examples, graphical objects may also be interactive. For example, the graphical object 504*c* may be interactive similarly to (e.g., may produce the same result as an interaction with) the interactive element 506*a*, etc. Whether the first row 502*a*, the second row 502*b*, the third row 502*c*, or any subset thereof, includes interactive elements, graphical objects, or a combination thereof can be determined by the computing system 102, for example using data accessed or received and associated with the particular digital interaction. The second page 500 can additionally or alternatively include a finalize interactive element 508 that can be selected once the sufficient amount of information is received to proceed with the particular digital interaction.

The customizable user interface 104, the first page 400, the second page 500, any other pages of the customizable user interface 104, or any combination thereof may be involved with one or more digital processes provided by one or more service providers. In a particular example, the one or more digital processes may be or include digital banking provided by a provider of financial services such as a bank. In this example, the customizable user interface 104, or any page thereof, may be used to submit or manage claims of fraudulent previously executed interactions, incomplete previously executed interactions, unsatisfactory previously executed interactions, and the like.

Although the subject matter has been described in language specific to structural features or methodological acts, it is to be understood that the subject matter defined in the appended claims is not necessarily limited to the specific features or acts described above. Rather, the specific features and acts described above are disclosed only for the purpose of illustration and description and they are not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:

a processor; and a memory including instructions that are executable by the processor for causing the processor to perform operations comprising:

receiving authentication data from a user computing device, the authentication data indicating a request by a user entity associated with the user computing device to access data relating to in-progress digital interactions;

in response to the system validating the authentication data, providing a first user interface page of a customizable user interface to the user computing device, the first user interface page comprising a first set of interactive elements, each interactive element of the first set of interactive elements representing a different in-progress digital interaction of a set of in-progress digital interactions, the first set of interactive elements arranged on the first user interface page to provide the set of in-progress digital interactions as an interactive list;

receiving first input from the user computing device, the first input indicating selection of a particular first interactive element of the first set of interactive elements;

providing a second user interface page of the customizable user interface to the user computing device, the second user interface page comprising a second set of interactive elements and a set of corresponding alerts, the second user interface page generatable based on the particular first interactive element, each at least some of the interactive elements of the second set of interactive elements representing a particular type of data associated with a process for performing a particular digital interaction of the set of in-progress digital interactions that corresponds with the particular first interactive element, the set of corresponding alerts arranged on the second user interface page to solicit interaction of the user entity with the at least some of the interactive elements to facilitate the process for performing the particular digital interaction;

receiving second input from the user computing device, the second input indicating selection of a particular second interactive element of the second set of interactive elements, the second input comprising previously missing data provided by the user entity in response to the system providing the set of corresponding alerts; and controlling the particular digital interaction involving the user entity based on the second input and the process for performing the particular digital interaction.

2. The system of claim 1, wherein the operation of providing the first user interface page comprises:

accessing a data repository that comprises user account data associated with the user entity;

determining the set of in-progress digital interactions by identifying in-progress digital interactions indicated by the user account data; and generating the first set of interactive elements by assigning each in-progress digital interaction of the set of in-progress digital interactions to a different interactive element of the first set of interactive elements.

3. The system of claim 1, wherein the set of in-progress digital interactions comprises a set of potential reversals of previously executed interactions involving the user entity, and wherein controlling the particular digital interaction comprises initiating a reversal of a particular previously executed interaction associated with the particular digital interaction.

4. The system of claim 1, wherein the operation of providing the second user interface page comprises:

accessing a data repository comprising data about the set of in-progress digital interactions;

determining types of data for initiating the particular digital interaction based on data accessed via the data repository, wherein the particular type of data is included in the types of data;

determining a subset of the types of data that are missing from a request to initiate the particular digital interaction; and generating the second set of interactive elements based on the subset of the types of data and the types of data.

5. The system of claim 4, wherein:

the second set of interactive elements comprises a first subset of second interactive elements for satisfied types of data and a second subset of second interactive elements for missing types of data;

each interactive element of the first subset of second interactive elements has a first corresponding alert of the set of corresponding alerts that notifies the user entity that a first corresponding type of data of the interactive element is satisfied for the particular digital interaction; and each interactive element of the second subset of second interactive elements has a second corresponding alert of the set of corresponding alerts that notifies the user entity that a second corresponding type of data of the interactive element is not satisfied for the particular digital interaction.

6. The system of claim 5, wherein the second corresponding alert comprises an input field that facilitates input to satisfy the second corresponding type of data.

7. The system of claim 1, wherein:

the first set of interactive elements are arranged vertically offset from one another to form a vertical list representing the set of in-progress digital interactions;

each interactive element of the first set of interactive elements is configured to provide a drop-down description in response to input indicating selection of the interactive element;

the second set of interactive elements are arranged laterally offset from one another to form a pseudo-timeline of events, with respect to the particular digital interaction, represented by the second set of interactive elements; and each interactive element of the second set of interactive elements is configured to provide a status indicator and, if a status is similar or identical to "not satisfied," a field for providing input to satisfy data corresponding to the interactive element.

8. A method comprising:

receiving, by a computing system, authentication data from a user computing device, the authentication data indicating a request by a user entity associated with the user computing device to access data relating to in-progress digital interactions;

validating, by the computing system, the authentication data;

in response to the computing system validating the authentication data, providing, by the computing system, a first user interface page of a customizable user interface to the user computing device, the first user interface page comprising a first set of interactive elements, each interactive element of the first set of interactive elements representing a different in-progress digital interaction of a set of in-progress digital interactions, the first set of interactive elements arranged on the first user interface page to provide the set of in-progress digital interactions as an interactive list;

receiving, by the computing system, first input from the user computing device, the first input indicating selection of a particular first interactive element of the first set of interactive elements;

providing, by the computing system, a second user interface page of the customizable user interface to the user computing device, the second user interface page comprising a second set of interactive elements and a set of corresponding alerts, the second user interface page generatable based on the particular first interactive element, each at least some of the interactive elements of the second set of interactive elements representing a particular type of data associated with a process for performing a particular digital interaction of the set of in-progress digital interactions that corresponds with the particular first interactive element, the set of corresponding alerts arranged on the second user interface page to solicit interaction of the user entity with the at least some of the interactive elements to facilitate the process for performing the particular digital interaction;

receiving, by the computing system, second input from the user computing device, the second input indicating selection of a particular second interactive element of the second set of interactive elements, the second input comprising previously missing data provided by the user entity in response to the system providing the set of corresponding alerts; and controlling, by the computing system, the particular digital interaction involving the user entity based on the second input and the process for performing the particular digital interaction.

9. The method of claim 8, wherein providing the first user interface page comprises:

accessing a data repository that comprises user account data associated with the user entity;

determining the set of in-progress digital interactions by identifying in-progress digital interactions indicated by the user account data; and generating the first set of interactive elements by assigning each in-progress digital interaction of the set of in-progress digital interactions to a different interactive element of the first set of interactive elements.

10. The method of claim 8, wherein the set of in-progress digital interactions comprises a set of potential reversals of previously executed interactions involving the user entity, and wherein controlling the particular digital interaction comprises initiating a reversal of a particular previously executed interaction associated with the particular digital interaction.

11. The method of claim 8, wherein providing the second user interface page comprises:

accessing a data repository comprising data about the set of in-progress digital interactions;

determining types of data for initiating the particular digital interaction based on data accessed via the data repository, wherein the particular type of data is included in the types of data;

determining a subset of the types of data that are missing from a request to initiate the particular digital interaction; and generating the second set of interactive elements based on the subset of the types of data and the types of data.

12. The method of claim 11, wherein:

the second set of interactive elements comprises a first subset of second interactive elements for satisfied types of data and a second subset of second interactive elements for missing types of data;

each interactive element of the first subset of second interactive elements has a first corresponding alert of the set of corresponding alerts that notifies the user entity that a first corresponding type of data of the interactive element is satisfied for the particular digital interaction; and each interactive element of the second subset of second interactive elements has a second corresponding alert of the set of corresponding alerts that notifies the user entity that a second corresponding type of data of the interactive element is not satisfied for the particular digital interaction.

13. The method of claim 12, wherein the second corresponding alert comprises an input field that facilitates input to satisfy the second corresponding type of data.

14. The method of claim 8, wherein:

the first set of interactive elements are arranged vertically offset from one another to form a vertical list representing the set of in-progress digital interactions;

each interactive element of the first set of interactive elements is configured to provide a drop-down description in response to input indicating selection of the interactive element;

the second set of interactive elements are arranged laterally offset from one another to form a pseudo-timeline of events, with respect to the particular digital interaction, represented by the second set of interactive elements; and each interactive element of the second set of interactive elements is configured to provide a status indicator and, if a status is similar or identical to "not satisfied," a field for providing input to satisfy data corresponding to the interactive element.

15. A non-transitory computer-readable medium comprising program code executable by a processing device for causing the processing device to perform operations comprising:

receiving authentication data from a user computing device, the authentication data indicating a request by a user entity associated with the user computing device to access data relating to in-progress digital interactions;

in response to validating the authentication data, providing a first user interface page of a customizable user interface to the user computing device, the first user interface page comprising a first set of interactive elements, each interactive element of the first set of interactive elements representing a different in-progress digital interaction of a set of in-progress digital interactions, the first set of interactive elements arranged on the first user interface page to provide the set of in-progress digital interactions as an interactive list;

receiving first input from the user computing device, the first input indicating selection of a particular first interactive element of the first set of interactive elements;

providing a second user interface page of the customizable user interface to the user computing device, the second user interface page comprising a second set of interactive elements and a set of corresponding alerts, the second user interface page generatable based on the particular first interactive element, each at least some of the interactive elements of the second set of interactive elements representing a particular type of data associated with a process for performing a particular digital interaction of the set of in-progress digital interactions that corresponds with the particular first interactive element, the set of corresponding alerts arranged on the second user interface page to solicit interaction of the user entity with the at least some of the interactive elements to facilitate the process for performing the particular digital interaction;

receiving second input from the user computing device, the second input indicating selection of a particular second interactive element of the second set of interactive elements, the second input comprising previously missing data provided by the user entity in response to providing the set of corresponding alerts; and controlling the particular digital interaction involving the user entity based on the second input and the process for performing the particular digital interaction.

16. The non-transitory computer-readable medium of claim 15, wherein the operation of providing the first user interface page comprises:

accessing a data repository that comprises user account data associated with the user entity;

determining the set of in-progress digital interactions by identifying in-progress digital interactions indicated by the user account data; and generating the first set of interactive elements by assigning each in-progress digital interaction of the set of in-progress digital interactions to a different interactive element of the first set of interactive elements.

17. The non-transitory computer-readable medium of claim 15, wherein the set of in-progress digital interactions comprises a set of potential reversals of previously executed interactions involving the user entity, and wherein controlling the particular digital interaction comprises initiating a reversal of a particular previously executed interaction associated with the particular digital interaction.

18. The non-transitory computer-readable medium of claim 15, wherein the operation of providing the second user interface page comprises:

accessing a data repository comprising data about the set of in-progress digital interactions;

determining types of data for initiating the particular digital interaction based on data accessed via the data repository, wherein the particular type of data is included in the types of data;

determining a subset of the types of data that are missing from a request to initiate the particular digital interaction; and generating the second set of interactive elements based on the subset of the types of data and the types of data.

19. The non-transitory computer-readable medium of claim 18, wherein:

the second set of interactive elements comprises a first subset of second interactive elements for satisfied types of data and a second subset of second interactive elements for missing types of data;

each interactive element of the first subset of second interactive elements has a first corresponding alert of the set of corresponding alerts that notifies the user entity that a first corresponding type of data of the interactive element is satisfied for the particular digital interaction;

each interactive element of the second subset of second interactive elements has a second corresponding alert of the set of corresponding alerts that notifies the user entity that a second corresponding type of data of the interactive element is not satisfied for the particular digital interaction; and wherein the second corresponding alert comprises an input field that facilitates input to satisfy the second corresponding type of data.

20. The non-transitory computer-readable medium of claim 15, wherein:

the first set of interactive elements are arranged vertically offset from one another to form a vertical list representing the set of in-progress digital interactions;

each interactive element of the first set of interactive elements is configured to provide a drop-down description in response to input indicating selection of the interactive element;

the second set of interactive elements are arranged laterally offset from one another to form a pseudo-timeline of events, with respect to the particular digital interaction, represented by the second set of interactive elements; and each interactive element of the second set of interactive elements is configured to provide a status indicator and, if a status is similar or identical to "not satisfied," a field for providing input to satisfy data corresponding to the interactive element.

* * * * *